(12) United States Patent
Kakutani

(10) Patent No.: US 8,681,378 B2
(45) Date of Patent: Mar. 25, 2014

(54) IMAGE PROCESSING APPARATUS FOR GENERATING DOT DATA FOR IMAGE DATA, PRINTING APPARATUS FOR GENERATING DOT DATA FOR IMAGE DATA, AND IMAGE PROCESSING METHOD FOR GENERATING DOT DATA FOR IMAGE DATA

(75) Inventor: Toshiaki Kakutani, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 74 days.

(21) Appl. No.: 13/428,462

(22) Filed: Mar. 23, 2012

(65) Prior Publication Data

US 2012/0243012 A1  Sep. 27, 2012

(30) Foreign Application Priority Data

Mar. 24, 2011  (JP) .................................. 2011-066008

(51) Int. Cl.
G06F 15/00 (2006.01)
(52) U.S. Cl.
USPC ............................................... 358/1.9
(58) Field of Classification Search
None
See application file for complete search history.

(56) References Cited

U.S. PATENT DOCUMENTS

| 5,383,033 | A | 1/1995 | Takahashi |
| 6,674,546 | B1 * | 1/2004 | Nakahara ...................... 358/1.9 |
| 7,639,402 | B2 * | 12/2009 | Vestjens et al. ............... 358/3.26 |
| 2008/0239351 | A1 * | 10/2008 | Yada ............................... 358/1.9 |
| 2011/0063684 | A1 | 3/2011 | Kakutani |

FOREIGN PATENT DOCUMENTS

| JP | 05-122510 A | 5/1993 |
| JP | 2001-292320 A | 10/2001 |
| JP | 2011-066594 A | 3/2011 |

* cited by examiner

*Primary Examiner* — Jeremiah Bryar
(74) *Attorney, Agent, or Firm* — Global IP Counselors, LLP

(57) ABSTRACT

An image is divided into first a second regions on the basis of inputted image data, and a comparison is made between the gradation values of pixels in the first region and threshold values corresponding to the pixels of the first region of a dither mask. The results of the comparison are referenced to determine whether or not dots are formed in the pixels of the first region. Errors are calculated based on the results of determining the first boundary pixels, which are in the first region near the boundary between the first region second regions. Some of the errors are distributed as diffusion errors to pixels in the second region near the boundary. The diffusion errors distributed from the first boundary pixels are added, and it is determined whether or not dots are formed by the error diffusion method in the pixels of the second region.

13 Claims, 9 Drawing Sheets

| | DOT ON/OFF DETERMINATION | BINARIZATION ERROR (En) CALCULATION |
|---|---|---|
| EDGE PIXEL | COMPARE CORRECTION DATA (dataX) WITH ERROR DIFFUSION THRESHOLD VALUE (ED_th) | En = dataX - rs |
| NON-EDGE PIXEL | COMPARE DENOTED PIXEL DATA (Dn) WITH DITHER THRESHOLD VALUE (TH_th) | En = dataX - rs |

Fig. 7

| | PROVISIONAL DITHERING RESULTS | | THRESHOLD VALUE DIFFERENCE | DOT DATA CHARACTERISTICS |
|---|---|---|---|---|
| | DOT ON | DOT OFF | | |
| EDGE PIXEL | ERROR DIFFUSION THRESHOLD VALUE: EDTH-0 (LOW THRESHOLD VALUE) | ERROR DIFFUSION THRESHOLD VALUE: EDTH+0 (HIGH THRESHOLD VALUE) | 0 | ERROR DIFFUSION METHOD ELEMENT: LARGE |
| NON-EDGE PIXEL | ERROR DIFFUSION THRESHOLD VALUE: EDTH-64 (LOW THRESHOLD VALUE) | ERROR DIFFUSION THRESHOLD VALUE: EDTH+64 (HIGH THRESHOLD VALUE) | 128 | DITHER METHOD ELEMENT: LARGE |

Fig. 9

IMAGE PROCESSING APPARATUS FOR GENERATING DOT DATA FOR IMAGE DATA, PRINTING APPARATUS FOR GENERATING DOT DATA FOR IMAGE DATA, AND IMAGE PROCESSING METHOD FOR GENERATING DOT DATA FOR IMAGE DATA

CROSS-REFERENCE TO RELATED APPLICATIONS

This application claims priority to Japanese Patent Application No. 2011-066008 filed on Mar. 24, 2011. The entire disclosure of Japanese Patent Application No. 2011-066008 is hereby incorporated herein by reference.

BACKGROUND

Technological Field

The present invention relates to a printing technique for printing image data that expresses a predetermined image and, more specifically, to a technique for generating dot data that expresses whether or not dots are formed.

BACKGROUND TECHNOLOGY

The dither method and error diffusion method are widely known as the techniques (referred to below as halftone techniques) used in printing apparatus to express gradation in images using expression methods that have less gradation than the original image. Because the dither method and the error diffusion method both have merits and drawbacks, a halftone process has long been desired in which the dither method is combined with the error diffusion method. For example, techniques have been disclosed in Patent Citations 1 and 2 in which a halftone process is performed that combines a dither method element and an error diffusion method element by using a threshold value in the dither mask as a threshold value in the error diffusion method and by periodically changing the threshold value. However, in these halftone process techniques, image processing cannot be performed appropriately in images having predetermined characteristics.

Japanese Laid-open Patent Publication No. 2001-292320 (Patent Document 1) and Japanese Laid-open Patent Publication No. 5-122510 (Patent Document 2) are examples of the related art.

SUMMARY

Problems to be Solved by the Invention

An advantage of the invention is to provide a technique for appropriately performing image processing which incorporates the dither method and the error diffusion method.

Means Used to Solve the Above-Mentioned Problems

An advantage of the invention is to solve the above-mentioned problem by providing a technique for appropriately performing image processing which incorporates the dither method and the error diffusion method.

Application Example 1

An image processing apparatus for processing image data having a plurality of pixels and expressing an image using a gradation value for each pixel, wherein the image processing apparatus includes: an input unit for inputting the image data; a region-dividing processor for dividing the image into at least a first region and a second region on the basis of the inputted image data; a comparator for comparing gradation values of pixels in the first region and threshold values corresponding to the pixels of the first region of a dither mask having a plurality of threshold values; a first dot-decision processor for deciding whether or not dots are formed in pixels of the first region among first boundary pixels, which are pixels in the first region near the boundary between the first region and the second region, using information on pixels included in the first region and not using information on pixels included in the second region; a second dot-decision processor for deciding whether or not dots are formed in pixels of the second region among some of the pixels in the second region, using information on pixels included in the first region and information on pixels included in the second region; and a dot data generator for generating dot data for the image data using formation or non-formation of dots as decided by the first and second dot-decision processors.

In this image processing apparatus, separate image-processing elements can be applied to the first region and the second region. Switching between the two regions having different image-processing elements can be performed smoothly because the image processing performed in the first region does not affect the second region, and the image processing performed in the second region is affected by the first region.

Application Example 2

The image processing apparatus of Application Example 1, wherein the first dot-decision processor adds the diffusion errors distributed from the processed pixels near the first boundary pixels to the gradation values of the first boundary pixels, calculates the first corrected gradation values, and references at least the comparison results to decide whether or not dots are formed in pixels of the first region, and then calculates errors between the first corrected gradation values and the first decision result values, which are values corresponding to density expressed by the pixels in the results of decisions among the first boundary pixels, and distributes the errors as diffusion errors to unprocessed pixels near the first boundary pixels.

In this image processing apparatus, it is possible to appropriately generate dot data in which the first boundary pixels combine dithering elements with error diffusion elements. As image processing in which the dither method and the error diffusion method are combined, this can more accurately reflect the characteristics of the dither mask in comparison with a case in which the error diffusion method is performed using the threshold values of the dither mask; that is, compared with a case in which the error diffusion method is performed so as to compare the threshold values of the dither mask with corrected gradation values in which the gradation values of the pixels have been corrected using diffusion errors.

Application Example 3

The image processing apparatus of Application Example 1, wherein the second dot-decision processor calculates second corrected gradation values in which diffusion errors distributed from processed pixels among some of the pixels in the second region in an adjacent area that includes the first boundary pixels have been added to the gradation values of the pixels, compares the second corrected gradation values and a predetermined threshold value to calculate the second corrected gradation values, compares the second corrected gradation values and a predetermined threshold value to decide whether or not dots are formed, calculates errors between the second corrected gradation values and second decision result values, which are values corresponding to density expressed by the pixels in the results of the decisions, and distributes the errors as diffusion errors to pixels in an adjacent area.

In this image processing apparatus, switching the image-processing elements from the first region to the second region is performed smoothly because some of the pixels in the second region have error diffusion elements in which information on the pixels in the first region is also taken into account.

Application Example 2

The image processing apparatus of Application Example 1, wherein the region-dividing processor divides the image that comprises the plurality of pixels so that the region that satisfies predetermined conditions for a region suitable for processing by the dither method becomes the first region, and the region that satisfies predetermined conditions for a region suitable for processing by the error diffusion method becomes the second region.

In the image processing apparatus, image processing can be performed appropriately on a region that satisfies predetermined conditions for a region suitable for processing by the dither method, and a region that satisfies predetermined conditions for a region suitable for processing by the error diffusion method.

Application Example 3

The image processing apparatus of Application Example 1 or 2, wherein the first dot-decision processor decides, as a result of the comparison, that dots are formed in cases in which the gradation value of a pixel in the first region is greater than the threshold value corresponding to a pixel in the first region of the dither mask, and that dots have not been formed in cases in which the gradation value is less than the threshold value.

In this image processing apparatus, a process is performed to decide, as a result of the comparison, that dots are formed in cases in which the gradation value of a pixel in the first region is greater than the threshold value corresponding to a pixel in the first region of the dither mask, and dots have not been formed in cases in which the gradation value is less than the threshold value. Therefore, the characteristics of the dither mask can be sufficiently reflected in the generation of dot data.

Application Example 4

The image processing apparatus of Application Example 1 or 2, wherein the first dot-decision processor compares a predetermined determination value and third corrected gradation values in which diffusion errors distributed from processed pixels among some of the pixels in an area adjacent to the first region have been added to the gradation values of the pixels, and decides whether or not dots are formed, and, as a result of the comparison by the comparator, adjusts the determination values within a predetermined width so that the determination value applied in cases in which the gradation value of a pixel in the first region is greater than the threshold value corresponding to a pixel in the first region of the dither mask does not exceed the determination value applied in cases in which the gradation value of a pixel in the first region is equal to or less than the threshold value corresponding to a pixel in the first region of the dither mask.

In this information processing apparatus, a dot pattern in which error diffusion elements (for example, excellent dot dispersibility and continuity characteristics) or dithering elements have been enhanced can be generated in the first region, depending on how the determination values have been adjusted. Therefore, images can be appropriate processed by adjusting the determination values and adjusting the strength of the error diffusion elements and dithering elements, depending on the characteristics of the image data to be printed.

Application Example 5

The image processing apparatus of any of Application Examples 1 through 4, wherein the second dot-decision processor decides whether or not dots are formed by the error diffusion method, using an error diffusion threshold value prepared in advance as a threshold value used in the error diffusion method.

In this image processing apparatus, whether or not dots are formed in the second region can be decided using the commonly used error diffusion method; that is, using the error diffusion method in which an error diffusion threshold value prepared in advance is used.

Application Example 6

The image processing apparatus of any of Application Examples 1 through 5, wherein the first region is a region composed of pixels without edge pixels, the edge pixels being pixels constituting an edge having gradation value whose difference with respect to an adjacent pixel is equal to or greater than a predetermined value, and wherein the second region is a region composed of the edge pixels.

In this image processing apparatus, it is determined whether or not dots are formed using the error diffusion method in the edge pixels. Therefore, when printing is performed using the generated dot data, a printed image can be obtained having superior edge reproducibility.

Application Example 7

The image processing apparatus of any of Application Examples 1 through 5, wherein the second region is a thin-line or character region included in an image.

When printing is performed using dot data generated by this image processing apparatus, a printed image can be obtained having superior line and character reproduction.

Application Example 8

The image processing apparatus of any of Application Examples 1 through 5, wherein the first region is a region composed of inner pixels, which are pixels other than outer edge pixels constituting an outer edge of a line drawing, among the pixels constituting the line drawing included in the image, and wherein the second region is a region composed of the outer edge pixels.

When printing is performed using dot data generated by this image processing apparatus, a printed image can be obtained in which a line drawing has superior contour reproducibility.

Application Example 10

The image processing apparatus of any of Application Examples 1 through 5, wherein the first region is a region having less noise in high-frequency components than a predetermined value, and wherein the second region is a region having more noise in the high-frequency components than the predetermined value.

When printing is performed using dot data generated by this image processing apparatus, deterioration of the printed image due to interference caused by the periodicity of the dither mask in regions having a large amount of high-frequency components can be inhibited.

Application Example 11

A printing apparatus for performing a printing operation on the basis of image data having a plurality of pixels and expressing an image using a gradation value for each pixel, wherein the printing apparatus includes: an input unit for inputting the image data; a region-dividing processor for dividing the image into at least a first region and a second region on the basis of the inputted image data; a comparator for comparing gradation values of pixels in the first region and threshold values corresponding to the pixels of the first region of a dither mask having a plurality of threshold values; a first dot-decision processor for adding the diffusion errors distributed from processed pixels near the first boundary pixels to the gradation values of the first boundary pixels in the first boundary pixels, which are pixels in the first region near the boundary between the first region and the second region, calculating the first corrected gradation values, and referencing at least the comparison results to decide whether or not dots are formed in pixels of the first region, and then calculating errors between the first corrected gradation values and the first decision result values, which are values corresponding to density expressed by the pixels in the results of decisions among the first boundary pixels, and distributing the errors as diffusion errors to unprocessed pixels near the first boundary pixels; a second dot-decision processor for calculating second corrected gradation values in which diffusion errors distributed from processed pixels among some of the pixels in the second region in an adjacent area that includes the first boundary pixels have been added to the gradation values of the pixels, comparing the second corrected gradation values and a predetermined threshold value to decide whether or not dots are formed, calculating errors between the second corrected gradation values and second decision result values, which are values corresponding to density expressed by the pixels in the results of the decisions, and distributing the errors as diffusion errors to pixels in an adjacent area; a dot data generator for generating dot data for the image data using formation or non-formation of dots as decided by the first and second dot-decision processors; and a printing unit for performing a printing operation on the basis of the dot data.

This printing apparatus can switch smoothly between image processing in the first region and image processing in the second region, and dot data combining dithering elements and error diffusion elements can be appropriately generated and printed. Also, this printing apparatus decides whether or not dots are formed using the results of a comparison of the gradation values of the first boundary pixels and the threshold value of the dither mask. Thus, as image processing in which the dither method and the error diffusion method are combined, this arrangement makes it possible to more accurately reflect the characteristics of the dither mask in comparison with a case in which the error diffusion method is performed using the threshold values of the dither mask.

Application Example 12

An image processing method for processing image data having a plurality of pixels and expressing an image using a gradation value for each pixel, the image processing method including the steps of: inputting the image data; dividing the image into at least a first region and a second region on the basis of the inputted image data; comparing gradation values of pixels in the first region and threshold values corresponding to the pixels of the first region of a dither mask having a plurality of threshold values; adding the diffusion errors distributed from processed pixels near the first boundary pixels to the gradation values of the first boundary pixels in the first boundary pixels, which are pixels in the first region near the boundary between the first region and the second region, calculating the first corrected gradation values, and referencing at least the comparison results to decide whether or not dots are formed in pixels of the first region, and then calculating errors between the first corrected gradation values and the first decision result values, which are values corresponding to density expressed by the pixels in the results of decisions among the first boundary pixels, and distributing the errors as diffusion errors to unprocessed pixels near the first boundary pixels; calculating second corrected gradation values in which diffusion errors distributed from processed pixels among some of the pixels in the second region in an adjacent area that includes the first boundary pixels have been added to the gradation values of the pixels, comparing the second corrected gradation values and a predetermined threshold value to decide whether or not dots are formed, calculating errors between the second corrected gradation values and second decision result values, which are values corresponding to density expressed by the pixels in the results of the decisions, and distributing the errors as diffusion errors to pixels in an adjacent area; and generating dot data for the image data using formation or non-formation of dots as decided by the first and second dot-decision processors.

This image processing method can switch smoothly between image processing in the first region and image processing in the second region, and dot data combining dithering elements and error diffusion elements can be generated. Also, it is decided with this image processing method whether or not dots are formed, using the results of a comparison of the gradation values of the first boundary pixels and the threshold values of the dither mask. Thus, as image processing in which the dither method and the error diffusion method are combined, this arrangement makes it possible to more accurately reflect the characteristics of the dither mask in comparison with a case in which the error diffusion method is performed using the threshold values of the dither mask.

In addition to a configuration as an image processing apparatus, the invention can be realized as a printing data generating apparatus, a printing method for printing with a printing apparatus, a printing program, and a recording medium for recording this program.

BRIEF DESCRIPTION OF THE DRAWINGS

Referring now to the attached drawings which form a part of this original disclosure:

FIG. 7 is an explanatory diagram summarizing the characteristics of the halftone process;

FIG. 9 is an explanatory diagram summarizing the characteristics of the halftone process in Example 2;

DETAILED DESCRIPTION OF EXEMPLARY EMBODIMENTS

Figure 1:
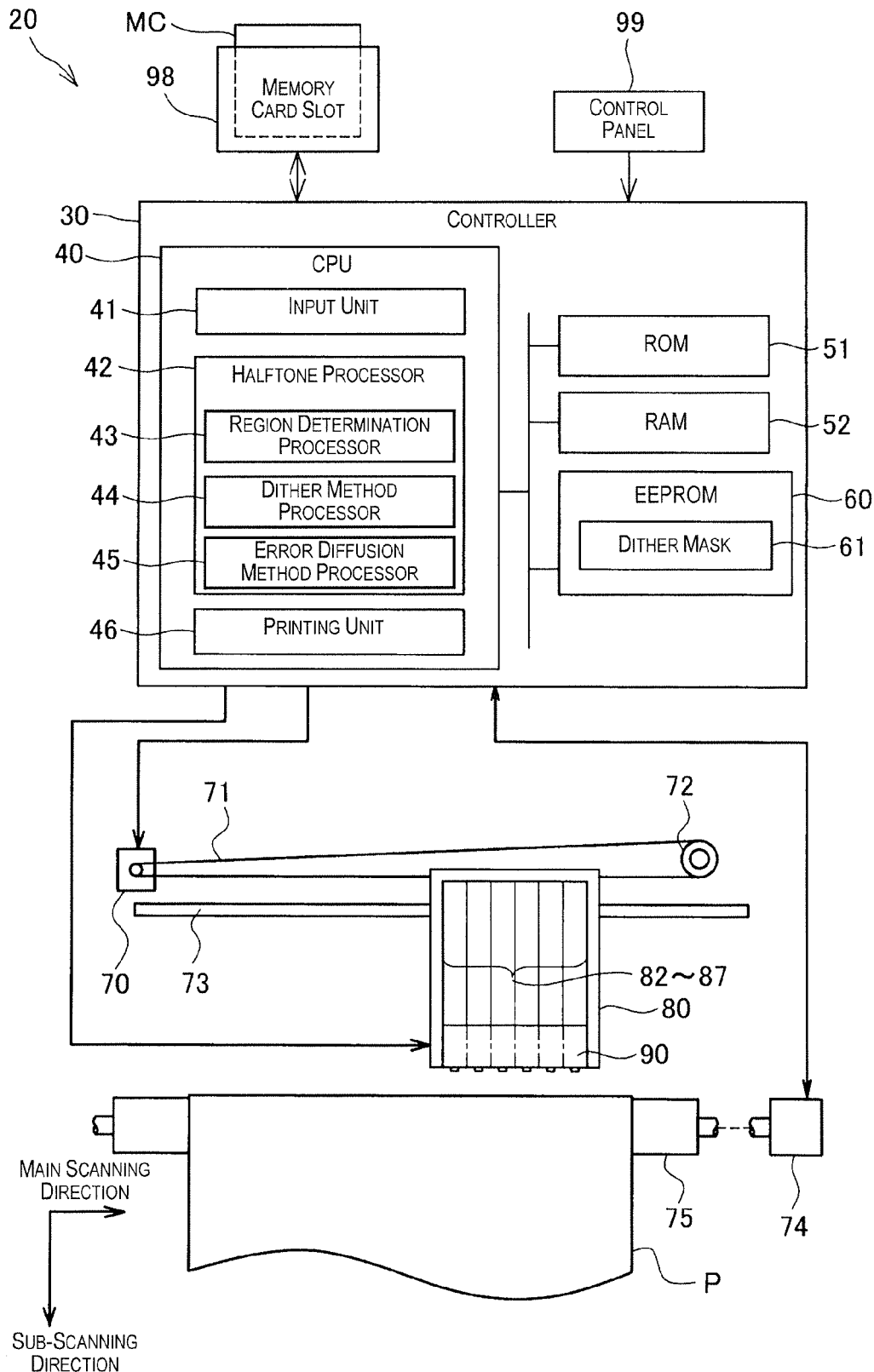
FIG. 1 is a schematic block diagram of a printer 20.

A. 1st Example:

(A1) Device Configuration:

FIG. 1 is a schematic block diagram of the printer 20 in the first example of the invention. The printer 20 is a serial-type inkjet printer for performing bi-directional printing as described below. As shown in the drawing, the printer 20 has a mechanism for transporting a print medium P using a paper feeding motor 74 (the direction of transport is also referred to below as the sub-scanning direction), a mechanism for reciprocating a carriage 80 in the axial direction of a platen 75 using a carriage motor 70 (this direction is referred to below as the main scanning direction), a mechanism for driving a print head 90 mounted in the carriage 80 to discharge ink and form dots, and a controller 30 for controlling the exchange of signals with the paper feeding motor 74, the carriage motor 70, the print head 90, and a control panel 99.

The mechanism for reciprocating the carriage 80 in the axial direction of the platen 75 has a sliding shaft 73 laid parallel to the shaft of the platen 75 and adapted to slidably hold the carriage 80; a pulley 72 sharing an endless drive belt 71 with the carriage motor 70; and the like.

Ink cartridges 82 to 87 containing cyan ink C, magenta ink M, yellow ink Y, black ink K, light cyan ink Lc, and light magenta ink Lm are mounted in the carriage 80. A row of nozzles corresponding to the color inks mentioned above are formed in the print head 90 in the bottom portion of the carriage 80. When the ink cartridges 82 to 87 have been mounted in the carriage 80 from above, ink can be supplied to the print head 90 from each cartridge.

The controller 30 is composed of a CPU 40, ROM 51, RAM 52, and EEPROM 60 connected to each other via a bus. Programs stored in the ROM 51 and the EEPROM 60 are extracted and run in the RAM 52, whereby the controller 30 can function as an input unit 41, halftone processor 42, and printing unit 49 in addition to controlling all of the operations of the printer 20. The functions of the halftone processor 42 include the functions of a region-determination processor 43, a dither method processor 44, and an error diffusion method processor 45. These functional units will be described in detail below.

A dither mask 61 is stored in a portion of the EEPROM 60. The dither mask 61 is used in a halftone process performed using the ordered dither method. In this example, the dither mask 61 includes a threshold value distribution having so-called blue noise characteristics. The term "threshold value distribution having blue noise characteristics" refers to a threshold value distribution in which dots are generated randomly when these dots are generated using a dither matrix having such a threshold value distribution, and in which the spatial frequency component of the set threshold values has the largest component in a high-frequency region having a period of two pixels or less. The term "threshold value distribution having green noise characteristics" described below refers to a threshold value distribution in which dots are generated randomly when these dots are generated using a dither matrix having such threshold value distribution, and in which the spatial frequency component of the set threshold values has the largest component in a mid-frequency region having a period of two pixels to several tens of pixels.

Also, in this example, the dither mask 61 has predetermined dot formation characteristics. In other words, the mask has characteristics that display good dot dispersibility irrespective whether the result is a dot pattern for a dot group formed by a reciprocating carriage 80 in bi-directional printing, a dot pattern for a dot group formed in multiple passes, or a dot pattern for all dot groups combining these. This technique is described, for example, in Japanese Laid-open Patent Publication No. 2007-15359. Instead of, or in addition to, providing good dispersibility to the aforementioned groups obtained in each reciprocating pass or multiple pass, the dither mask 61 can also provide good dot dispersibility to each main scanning group that indicates which of a plurality of main scanning operations performed by the carriage 80 are the operations that involve dot formation.

Good dot dispersibility can be identified as a dot pattern having blue noise characteristics or green noise characteristics. It can also be identified by a positive correlation coefficient between the spatial frequency distribution of the threshold values for the dither mask set for the pixels belonging to each one of a plurality of groups and the spatial frequency distribution of the printed image. This correlation coefficient is preferably 0.7 or greater.

A memory card slot 98 is connected to the controller 30, and image data ORG can be read and inputted from a memory card MC inserted into the memory card slot 98. In this example, the image data ORG inputted from the memory card MC is data having three color components: red (R), green (G), and blue (B). Each one of these colors is expressed by an 8-bit gradation value.

In a printer 20 having such a hardware configuration, the print head 90 is reciprocated in the main scanning direction with respect to print medium P by the driving of a carriage motor 70, or and print medium P is moved in the sub-scanning direction by the driving of a paper feeding motor 74. The controller 30 forms ink dots of the appropriate color in the appropriate locations on the print medium P by matching the reciprocating movement of the carriage 80 with the paper feeding movement of the print medium, and driving the nozzles according to the appropriate timing on the basis of the print data. In this way, the printer 20 can print a color image inputted from a memory card MC onto a print medium P.

Figure 2:
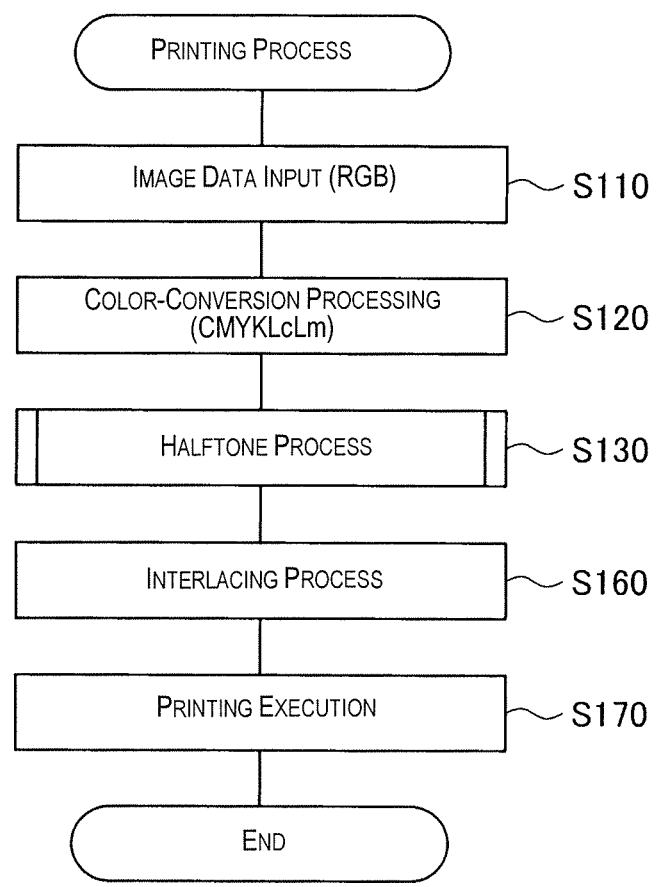
FIG. 2 is a flowchart showing the flow of the printing process.

(A2) Printing Process:

The following is a description of the printing process performed by the printer 20. FIG. 2 is a flowchart showing the flow of the printing process performed by the printer 20. Here, the printing process is initiated when the user uses a control panel 99 or the like to enter a command to print a predetermined image stored in a memory card MC. When the printing process has been initiated, the CPU 40 first reads and inputs the RGB-formatted image data ORG to be printed from the memory card MC via the memory card slot 98 (Step S110) as the processes of the input unit 41.

When the image data ORG is inputted, the CPU 40 references a lookup table (not shown) stored in EEPROM 60, and applies color conversion to the image data ORG to convert the RGB format to a format expressed by C (cyan), M (magenta), Y (yellow), K (black), Lc (light cyan), and Lm (light magenta) (Step S120).

When color conversion is performed, the CPU 40 performs, as a processes of the halftone processor 42, a halftone process in which the image data is converted to dot data representing the dot ON/OFF for each color (Step S130). The halftone process performed here is described in detail below. The halftone process is not limited to dot ON/OFF binarization. It can also be a multi-value process, such as ON/OFF for large dots and small dots. The image data provided in Step S130 can also be processed as an image by performing other processes such as resolution conversion or smoothing.

When the halftone process is performed, the CPU 40 matches the nozzle position of the printer 20 with the amount of paper feed and the like, and performs interlacing in which sorting is performed by dot pattern data to be printed per main-scanning unit (Step S160). When interlacing is performed, the CPU 40 sends dot data to the print head 90, drives the carriage motor 70 and the paper feeding motor 74, and executes printing (Step S170).

Figure 3:
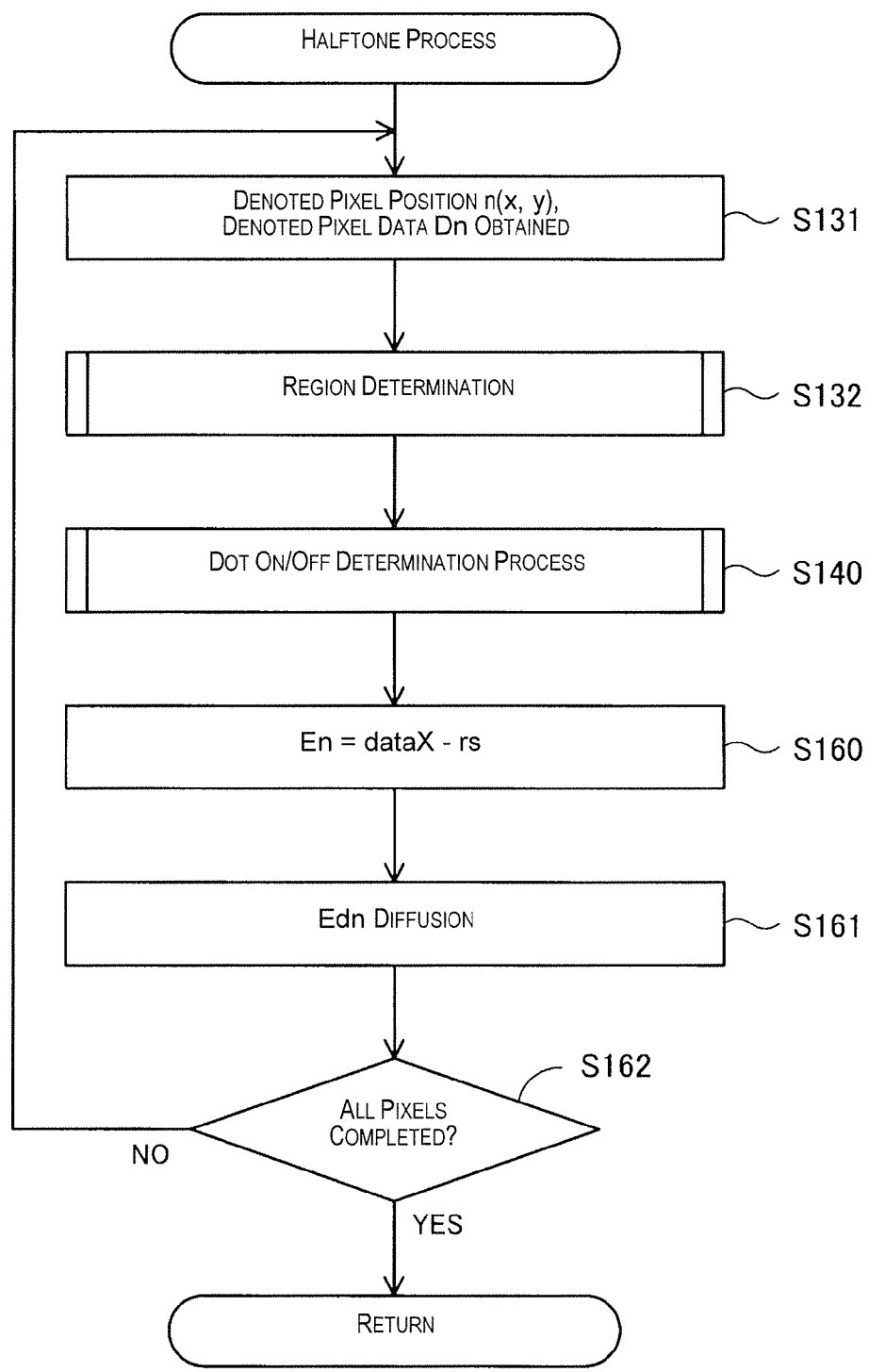
FIG. 3 is a flowchart showing the flow of the halftone process.

(A3) Halftone Process:

The following is a detailed description of the halftone process (Step S130). In this description, the gradation value for each pixel is from 0 to 255, and a larger gradation value indicates a darker color. FIG. 3 is a flowchart showing the flow of the halftone process. When this process has been initiated, the CPU 40 first obtains the coordinate data n(x, y) at the position of the denoted pixel and the denoted pixel data Dn, which is the gradation value data for the denoted pixel, in the image data that was color-converted in Step S120 (Step S131). The CPU 40 uses the region determination processor 43 to perform the region determination process (Step S132) when the coordinate data n(x, y) at the position of the denoted pixel and the denoted pixel data Dn have been obtained.

The region determination process (Step S132) will now be described in detail. In the region determination process performed in this example, it is determined whether or not the denoted pixel (x, y) is a darker-color pixel (referred to below as a higher-density edge pixel) among the pixels constituting an edge of the printed image (referred to below as edge pixels). More specifically, the gradation value of a pixel positioned a certain distance D from the denoted pixel (where D is a positive integer) (referred to below as the pixels subject to a difference study) is subtracted from the gradation value of the denoted pixel, and it is determined whether the difference value is greater than a predetermined threshold value (referred to below as the edge determination threshold value EDGE_TH). The value of the distance D can be established at various stages. It can be set in the design stage for the printing apparatus, it can be set manually by the user in the printing stage, or it can be set automatically by the printing apparatus during the printing process on the basis of the characteristics of the image data.

Figure 4:
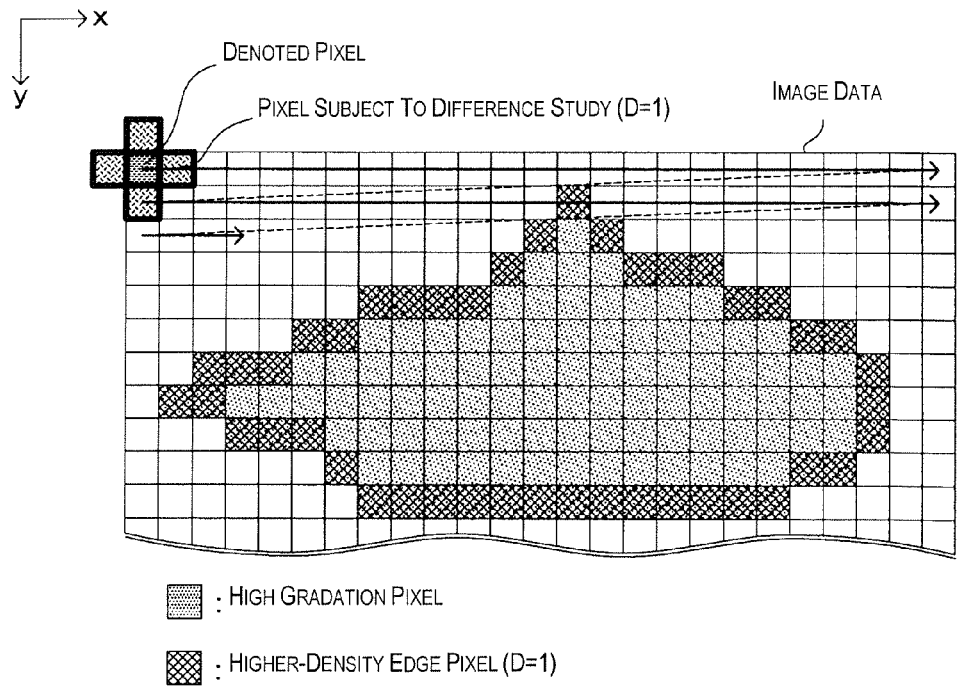
FIG. 4 is an explanatory diagram used to explain the region determination process (D=1)

FIG. 4 is an explanatory diagram used to explain an example of the region determination process in a case set to D=1. In a case set to D=1, the pixels subject to a difference study can be set to (x−1, y), (x+1, y), (x, y−1), and (x, y+1). In a case in which one of the following is true, date[$x,y$]−date[$x−1,y$]>EDGE_TH or date[$x,y$]−date[$x+1,y$]>EDGE_TH or date[$x,y$]−date[$x,y−1$]>EDGE_TH or date[$x,y$]−date[$x,y+1$]>EDGE_TH the denoted pixel (x, Y) is determined to be a higher-density edge pixel. Here, date [ . . . ] represents the gradation value for the pixel at the coordinates inside the bracket.

In this example, the denoted pixel is moved in the image data from above to below or from left to right in a case in which a predetermined direction has been established as a standard for a printed image. More specifically, it is set in the positive direction for the viewer to view the printed image. When the denoted pixel is positioned in a corner of the image data, some of the pixels subject to a difference study do not exist. In such cases, dummy pixels are set for the non-existent pixels subject to a difference study, and the region determination process is performed in which the gradation value of the dummy pixels is the same as the gradation value of the denoted pixel. In FIG. 4, the pixels having a high gradation value (referred to as high-gradation pixels below) are expressed by dot shading, and the higher-density edge pixels are expressed by cross-hatching.

Figure 5:
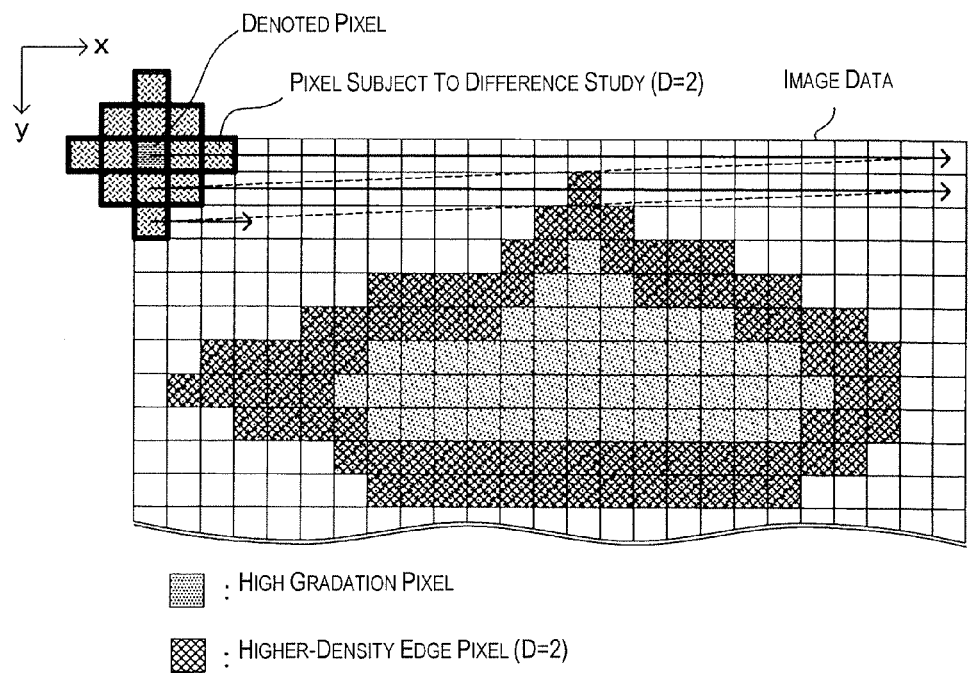
FIG. 5 is an explanatory diagram used to explain the region determination process (D=2)

In cases in which, for example, the distance is set to D=2, as shown in FIG. 5, pixels obtained by adding (x−2, y), (x+2, y), (x, y−2), (x, y+2), (x−1, y−1), (x+1, y−1), (x−1, y+1), and (x+1, y+1) as pixels subject to a difference study to the pixels subject to a difference study at D=1 can be set as pixels subject to a difference study. As in a case in which D=1, the size is compared with the edge determination threshold value EDGE_TH to determine whether or not the denoted pixel is a higher-density edge pixel.

The CPU 40 sets a flag to "1" for denoted pixels determined to be higher-density edge pixels, and sets the flag to "0" for all other pixels. The CPU 40 performs the region determination process in this way.

The description will now return to the halftone process (FIG. 3). After the region determination process has been performed, the CPU 40 performs a dot ON/OFF determination process in which it is determined whether or not dots are formed for each pixel on the basis of the results of the region determination process (Step S140). The dot ON/OFF determination process is described in greater detail below. The correction data dataX and the binarization result values rs calculated in this process are then used to calculate binarization errors En (Step S160). After the binarization errors En have been calculated, the CPU 40 distributes the binarization errors En as diffusion errors Edn at a ratio of 7/16 with respect to the pixels to the right of the denoted pixel, 3/16 with respect to the pixels to the lower left, 5/16 with respect to the pixels below, and 1/16 with respect to the pixels to the lower right, which are all surrounding pixels for which dot ON/OFF has not been decided (Step S161). The processing from Step S131 to Step S161 is performed on all of the pixels in the image data while moving the denoted pixel from left to right and from above to below with respect to the printed image (see FIG. 4) (Step S162).

Figure 6:
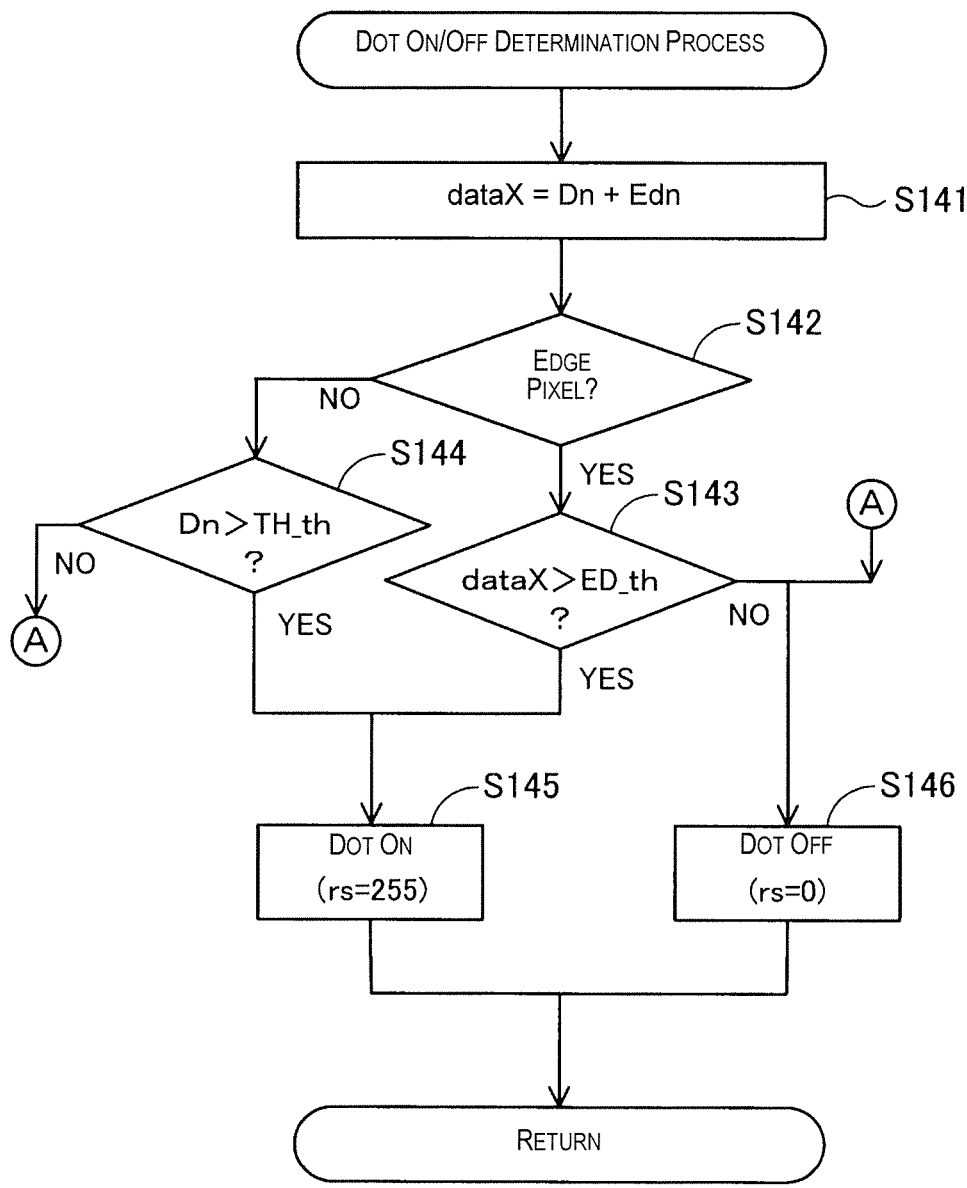
FIG. 6 is a flowchart showing the flow of the dot ON/OFF determination process.

The following is a description of the dot ON/OFF determination process (FIG. 3: Step S140). FIG. 6 is a flowchart showing the flow of the dot ON/OFF determination process. After the region determination process (FIG. 3: Step S132), the CPU 40 adds diffusion errors Edn stored in a separately provided error buffer to the gradation values of the denoted image data Dn to calculate correction data dataX (Step S140). The diffusion errors Edn are calculated in Step S160 of the halftone process for the other pixels.

After the correction data dataX has been calculated, the CPU 40 determines whether or not the denoted pixel is an edge pixel on the basis of the flag set in the region determination process mentioned above. In a case in which the denoted pixel is an edge pixel (Step S142: YES), the central processor functions as an error diffusion method processor 45 and compares the correction data dataX and the error diffusion threshold value ED_th used in the halftone process that is based on the error diffusion processing method (for example, 128). The error diffusion threshold value ED_th is stored in advance in the EEPROM 60 (not shown). When, as a result of the comparison of the correction data dataX and the error diffusion threshold value ED_th, the correction data dataX is greater (Step S144: YES), it is decided that a dot is turned ON at the denoted pixel, and the binarization result value is set to rs=255 (Step S145). When the correction data dataX is equal to or less than the error diffusion threshold value ED_th (Step S143: NO), it is decided that a dot is turned OFF at the denoted pixel, and the binarization result value is set to rs=0 (Step S146).

In cases in which the denoted pixel is a pixel other than an edge pixel (Step S142: NO), the CPU 40 functions as an error diffusion method processor 45 and compares the denoted pixel data Dn with a dither threshold value TH_th, which is the threshold value corresponding to the denoted pixel data Dn among the gradations constituting the dither mask 61 stored in the EEPROM 60 (Step S144). When, as a result of the comparison, the denoted pixel data Dn is greater than the dither threshold value TH_th (Step S144: YES), it is decided in the CPU 40 that a dot is turned ON at the denoted pixel, and the binarization result value is set to rs=255 (Step S145). When, as a result of the comparison, the denoted pixel data Dn is less than the dither threshold value TH_th (Step S144: NO), it is decided that a dot is turned OFF at the denoted pixel, and the binarization result value is set to rs=0 (Step S146). The CPU 40 performs the dot ON/OFF determination process in this way. In cases in which the denoted pixel is in a corner of the image in Step S143, there is no distribution of diffusion errors Edn from the surrounding pixels. In these cases, the relation Edn=0 is satisfied, and the denoted pixel data Dn is compared with the error diffusion threshold value ED_th. The aforementioned has been a description of the flow of the halftone process performed by the CPU 40.

FIG. 7 is an explanatory diagram summarizing the characteristics of the halftone process. The effects of the present example will be described using FIG. 7. As described above, when the printer 20 performs the halftone process, the dot ON/OFF decision for the edge pixels (higher-density edge pixels in the example) is performed using the error diffusion method. The dot ON/OFF decision for pixels other than the edge pixels is performed using the dither method. Because the error diffusion method has superior resolution and gradation reproducibility, the error diffusion method is applied to the edge pixels, especially the higher-density edge pixels in this example, to perform the halftone process, whereby text, line drawings, and the like composed of low-gradation fine lines in the printed image are less likely to be broken, and fine lines can be reproduced with precision.

Meanwhile, because the printer 20 makes a dot ON/OFF decision using the dither method in cases in which the halftone process is performed on pixels other than edge pixels (higher-density edge pixels in this example), deterioration in image quality due, for example, to landing position slippage of ink dots can be suppressed by endowing the dither mask being used with predetermined conditions. In this way, the printer 20 can divide the image data to be printed into predetermined regions, and apply the effective processing method for each region, whether it is the error diffusion method or the dither method, to make dot ON/OFF decisions.

Also, in the boundary for switching from a region in which dot ON/OFF is decided using the dither method (a dither method region) to a region in which dot ON/OFF is decided using the error diffusion method (an error diffusion method region), binarization errors in the dither method region are distributed to the error diffusion method region as diffusion errors. As a result, dot generation occurs continuously and smoothly in the boundary between a dither region and an error diffusion method region, and artificial contours are less likely to occur in the printed image due to a switch in the halftone process method.

In this example, the target of the comparison with the threshold values of the dither mask is the gradation values of the denoted pixels when dot ON/OFF is decided in regions where the halftone process is performed using the dither method. Error diffusion is performed in accordance with the error diffusion method, but the target of the comparison with the threshold values of the dither mask is not the correction data dataX, but the gradation value of the denoted pixel (denoted pixel data Dn). In this way, dot ON/OFF decisions can be made so as to sufficiently reflect the predetermined characteristics of the dither mask (dispersibility, periodicity, and the like).

In commonly used halftone process techniques combining the dither method and the error diffusion method, the threshold values of the dither mask are used in the error diffusion method. In these halftone process techniques, the target of the comparison with the threshold values of the dither mask is correction data composed of the gradation value of the denoted pixel and the diffusion error distributed from the surrounding pixels. When dot ON/OFF decisions are made by comparing correction data and the threshold values of the dither mask, a problem is encountered in that the characteristics inherently provided to the dither mask (dispersibility, characteristics for inhibiting the prominence of ink landing position slippage, and the like) are inhibited. This problem is solved because the target of comparison with the threshold values of the dither mask is the gradation value of the denoted pixel in the halftone process performed in this example, as described above.

As for the correspondence between this example and the claims, the region determination processor 43 corresponds to the region-dividing processor in the claims, the process performed in Step S143 of the dot ON/OFF determination process (FIG. 3) is the process performed by the comparator in the claims, the process performed in Steps S143 through S145, S146, and S160 and S161 of the dot ON/OFF determination process (FIG. 3) is the process performed by the first dot-decision processor in the claims, and the process performed in Steps S144 and S145, S146, and S160 and S161 of the dot ON/OFF determination process (FIG. 3) is the process performed by the second dot-decision processor in the claims.

B. 2nd Example:

The following is a description of the second example. A point of difference in the configuration of the printer 20a with respect to the printer 20 in the first example is that the halftone processor 42 is equipped with a comparator 47 and an error diffusion unit 48 instead of the dither method processor 44 and the error diffusion method processor 45 in the first example. The rest of the configuration of the printer 20a is identical to that of the printer 20 in the first example. The following is a detailed description of the comparator 47 and the error diffusion unit 48. Also, the printing process in the second example differs from the first example only in the dot ON/OFF determination process in the halftone process. The general flow of the printing process and the halftone process described in FIGS. 2 and 3 is the same. Therefore, the description corresponding to FIGS. 2 and 3 has been omitted.

Figure 8:
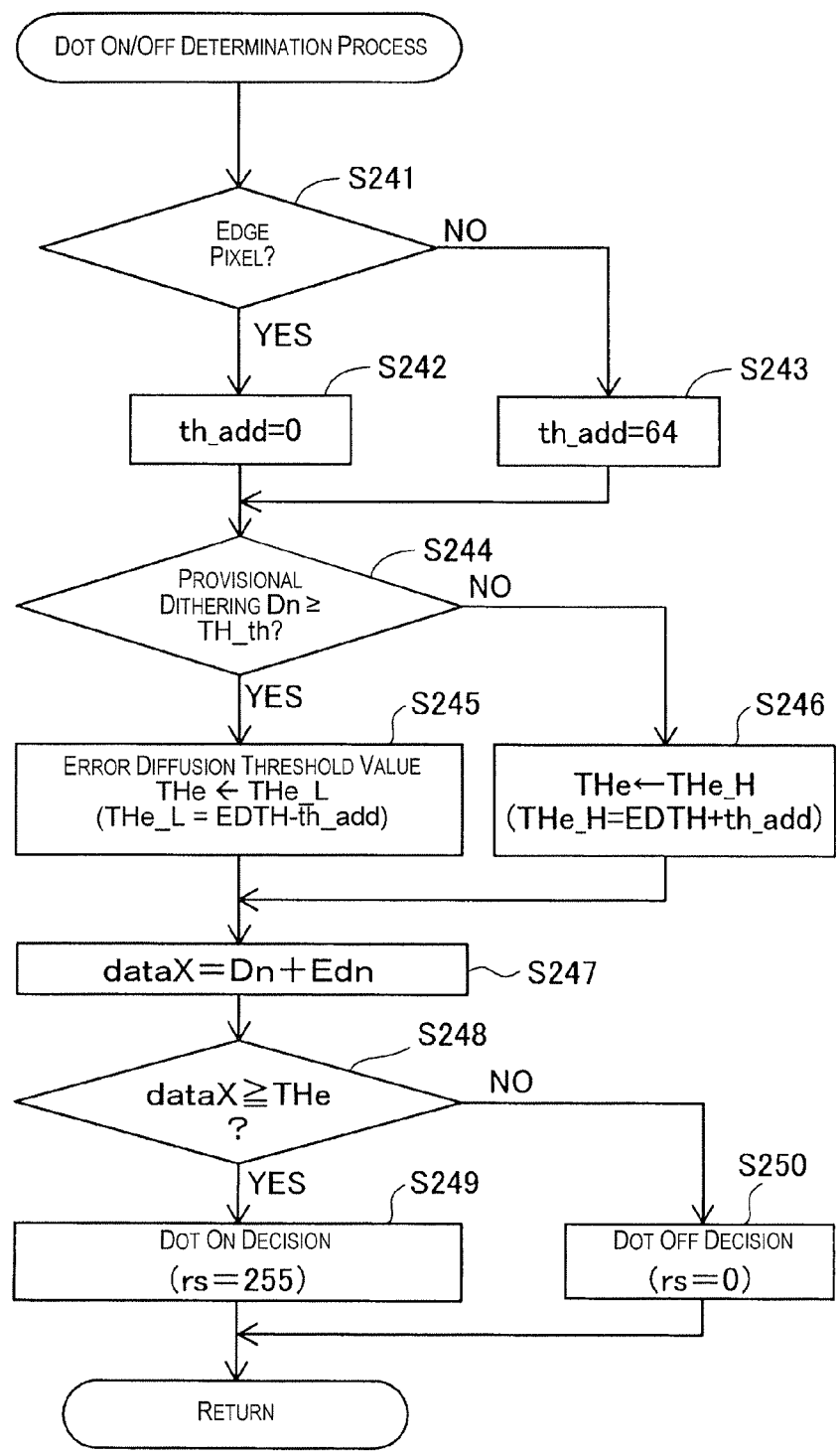
FIG. 8 is a flowchart showing the flow of the dot ON/OFF determination process in Example 2.

The following is a description of the flow of the dot ON/OFF determination process in the second example. FIG. 8 is a flowchart showing the flow of the dot ON/OFF determination process in the second example. When this process is initiated, the CPU 40 determines whether or not the denoted pixel is an edge pixel (a higher-density edge pixel in this example) on the basis of the flag set in the region determination process (Step S241). When the CPU 40 has determined that the denoted pixel is a higher-density edge pixel (Step S241: YES), the threshold-value increase/decrease parameter th_add for the denoted pixel, which is a parameter used in subsequent processing, is decided to be "0" (Step S242). When the CPU 40 has determined that the denoted pixel is not a higher-density edge pixel (Step S241: NO), the threshold-value increase/decrease parameter th_add for the denoted pixel is decided to be "64" (Step S243).

After the threshold-value increase/decrease parameter th_add has been decided for each denoted pixel, the CPU 40 performs a provisional dithering process (Step S244) as a process of the comparator 47. In this provisional dithering process, the size of the gradation value for the denoted pixel data Dn is compared with the dither threshold value TH_th corresponding to the denoted pixel data Dn among the threshold values constituting the dither mask 61 stored in the EEPROM 60. Formally, this process is the same as a dot ON/OFF determination commonly performed using the dither method. In effect, in the common dither method, a dot is determined to be ON when the gradation value of the denoted pixel data Dn is equal to or greater than the dither threshold value TH_th, and a dot is determined to be OFF when the gradation value of the denoted pixel data Dn is less than the dither threshold value TH_th. However, the provisional dithering process of this example differs in that it is a preliminary process for making a dot ON/OFF decision using the error diffusion method described below. More specifically, it is a process for deciding the threshold value for the error diffusion method.

When, as a result of the provisional dithering process, the gradation value of the denoted pixel data Dn is equal to or greater than the dither threshold value TH_th (Step S244: YES), the threshold value THe used in the error diffusion method is set to the low threshold value THe_L (Step S245). When the low threshold value THe_L has been set, the CPU 40 subtracts the threshold-value increase/decrease parameter th_add decided in the preceding processing from the reference error diffusion threshold value EDTH set in advance (for example, 128), and the difference value is set as the low threshold value THe_L. For example, in cases in which the denoted pixel is a higher-density edge pixel, the threshold-value increase/decrease parameter th_add is zero, and is therefore calculated as a low threshold value THe_L=EDTH−0. In cases in which the denoted pixel is a higher-density edge pixel, the threshold-value increase/decrease parameter th_add=64, and is therefore calculated as a low threshold value THe_L=EDTH−64.

When, as a result of the provisional dithering process, the gradation value of the denoted pixel data Dn is less than the dither threshold value TH_th (Step S244: NO), the threshold value THe used in the error diffusion method is set to the high threshold value THe_H (Step S246). When the high threshold value THe_H has been set, the CPU 40 adds the threshold-value increase/decrease parameter th_add decided in the preceding region determination process to the reference error diffusion threshold value EDTH set in advance (for example, 128), and the sum value is set as the high threshold value THe_H. For example, in cases in which the denoted pixel is a higher-density edge pixel, the threshold-value increase/decrease parameter th_add is zero, and is therefore calculated as a high threshold value THe_H=EDTH+0. In cases in which the denoted pixel is a higher-density edge pixel, the threshold-value increase/decrease parameter th_add=64, and is therefore calculated as a high threshold value THe_H=EDTH+64. Thus, in this configuration, the threshold value THe used in the error diffusion method is changed based on the result of the provisional dithering process.

When the threshold value THe has been set, the CPU 40 adds the diffusion error Edn prepared in advance and stored in the error buffer to the gradation value of the denoted pixel data Dn, and calculates the correction data dataX (Step S247). Because the calculation method for the diffusion error Edn used here is the same as the one used in the first example, further description has been omitted.

When the diffusion error Edn has been added to the gradation value of the denoted pixel data Dn, the CPU 40 compares the correction data dataX to the threshold value THe set in Step S245 or Step S246 (Step S248). As a result, when the correction data dataX is equal to or greater than the threshold value THe (Step S248: YES), a dot ON decision is made for the denoted pixel, and the binarization result value is set to rs=255 (Step S249). When the gradation value of the denoted pixel data Dn to which the diffusion error Edn has been added is less than the threshold value THe (Step S248: NO), a dot OFF decision is made for the denoted pixel, and the binarization result value is set to rs=0 (Step S250). The CPU 40 performs the dot ON/OFF decision processing in this way. The halftone process following the dot ON/OFF determination process is the same as the process performed in the first example (Step S160 and thereafter in FIG. 3), so further description has been omitted.

When a dot ON/OFF decision has been made, the CPU 40 calculates the binarization errors En by subtracting the binarization result value rs from the correction data dataX (Step S248). The diffusion errors Edn are then calculated in the same manner as the first example (Step S249). In this example as well, the binarization errors En are distributed as diffusion errors Edn at a ratio of 7/16 with respect to the pixels to the right of the denoted pixel, 3/16 with respect to the pixels to the lower left, 5/16 with respect to the pixels below, and 1/16 with respect to the pixels to the lower right, which are all surrounding pixels for which dot ON/OFF has not been decided. The diffusion errors Edn calculated in this manner are stored in the error buffer. In the dot ON/OFF determination process of this example, the binarization is only performed to make dot ON/OFF decisions. However, a multi-value process can also be performed to make ON/OFF decisions for large dots and small dots.

The basic principles of this halftone process will now be described using FIG. 9. FIG. 9 is an explanatory diagram summarizing the characteristics of the halftone process in the second example. In the process performed in Steps S244 through S246, as described above, in cases in which the gradation value of the denoted pixel data Dn is equal to or greater than the dither threshold value TH_th, that is, when a provisional process has been performed using the dither method, the threshold value THe used in the error diffusion method is set to the low threshold value THe_L if the dots are ON; and in cases in which the gradation value of the denoted pixel data Dn is less than the dither threshold value TH_th, that is, when a provisional process has been performed using the dither method, the threshold value THe is set to the high threshold value THe_H if the dots are OFF.

Here, a case will be considered in which the threshold difference value ΔTHe is defined as THe_H−THe_L and the threshold difference value ΔTHe is "0", that is, a case will be considered in this example in which the denoted pixel is a higher-density edge pixel (threshold-value increase/decrease parameter th_add=0). Because the results of the provisional dithering process have an effect on the threshold value THe in this case, the processing in Steps S244 through S246 is not meaningful with respect to the final dot ON/OFF decision made using the error diffusion method (Steps S248-S250). This means that the final dot ON/OFF decision is made using only an error diffusion method element in the halftone process performed in Step S130 (see FIG. 2). In FIG. 9, the error diffusion method element serving as a dot data characteristic is large.

Next, a case will be considered in which the threshold difference value ΔTHe is greater than 0 (THe_H>THe_L), that is, a case will be considered in this example in which the denoted pixel is a pixel other than a higher-density edge pixel (threshold-value increase/decrease parameter th_add=64). In this case, when the CPU 40 makes a dot ON determination in the provisional dithering process (the gradation value of the denoted pixel data Dn is equal to or greater than the dither threshold value TH_th), the threshold value THe is set to the relatively small low threshold value THe_L. When the CPU 40 makes a dot OFF determination in the provisional dithering process (the gradation value of the denoted pixel data Dn is less than the dither threshold value TH_th), the threshold value THe is set to the relatively large high threshold value THe_H. In other words, when the CPU 40 has made a dot ON determination using the provisional dithering process, controls are performed to facilitate a dot ON decision using the error diffusion method. When a dot OFF determination has been made using the provisional dithering process, controls are performed to facilitate a dot OFF decision using the error diffusion method. This means that, compared with a case in which the threshold difference value ΔTHe is zero, the final dot ON/OFF determination result in the error diffusion method is closer to the dot ON/OFF determination result in the provisional dithering process. In other words, the final dot ON/OFF determination is made by adding a dither method element to the error diffusion method element. In FIG. 9, the dither method element serving as a dot data characteristic is large.

In sum, the relative contribution of the dither method element and the error diffusion method element to the halftone process can be controlled by changing the threshold value THe; more specifically, changing the size of the threshold difference value ΔTHe, based on the results of the provisional dithering process. In this example, these principles are used to dynamically control the dither method element and the error diffusion method element in the halftone process on the basis of whether or not the denoted pixel is a higher-density edge pixel. This can be interpreted as being able to allow the extent of control aimed at facilitating dot formation by using the error diffusion method to be controlled based on the size of the threshold difference value ΔTHe.

As described above, when dot data is generated in accordance with the error diffusion method by a printer 20a thus configured, the results from the provisional dithering process are used to control the ease with which dots are formed using the error diffusion method. In other words, the dot ON/OFF determination results obtained on the assumption that the dither method was used are used to control the ease with which dots are formed by the error diffusion method. Therefore, the halftone process can be performed in which a dither method element and an error diffusion method element have been incorporated.

More specifically, in a case in which the results of the provisional dithering process performed by the printer 20a are dot ON, the threshold value THe used in the error diffusion method is set to the low threshold value THe_L, and control is performed so that dots are easier to form by the error diffusion method. When the results of the provisional dithering process are dot OFF, the threshold THe is set to the high threshold value THe_H, and control is performed so as to make it more difficult to form dots by the error diffusion method. In either type of control, the presence or absence of dot formation is closer to the results from the dither method than to dot data from the simple error diffusion method. As a result, the dither method element is enhanced. Therefore, by setting the extent of these controls, that is, the threshold difference value ΔTHe, and the size of the threshold-value increase/decrease parameter th_add in this example, it is possible to set the appropriate contribution of the dither method element and the error diffusion method element to the halftone process. Also, because the ease with which dots are formed using the error diffusion method is controlled simply by changing the threshold value THe on the basis of the results of the provisional dithering process, the configuration is simple and the processing is faster.

Also, the printer 20a in this example changes the threshold difference value ΔTHe on the basis of whether each of the pixels that form the image being printed is a higher-density edge pixel. More specifically, the printer is configured so that in a case in which the denoted pixel is a higher-density edge pixel, the error diffusion method element in the halftone process is enhanced by increasing the threshold difference value ΔTHe, and in a case in which the denoted pixel is not a higher-density edge pixel, the dither method element in the halftone process is enhanced.

The halftone process based on the error diffusion method has superior reproducibility both of resolution and of gradient elements. Therefore, in a case in which the image being printed contains fine lines rendered in low density (for example, characters or a rendered line drawing), the fine lines can be reproduced with precision and without breaking when the error diffusion method is applied to the pixels constituting the contours of the fine lines and to surrounding pixels.

The halftone process based on the dither method can inhibit deterioration in image quality due to the slippage of the landing position of ink dots by endowing the dither mask used with predetermined characteristics. Also, the execution speed during the halftone process is not affected even when the dither mask itself is generated so as to have advanced characteristics. Thus, from the standpoint of inhibiting image quality deterioration due to landing position slippage and from the standpoint of processing speed, the halftone process based on the dither method is very effective for the solid regions of an image being printed.

In this example, the error diffusion method element was enhanced and a halftone process was performed to improve reproducibility of fine lines for the higher-density edge pixels of an image being printed, and the dither method element was enhanced and a halftone process was performed to increase the processing speed and to prevent image quality deterioration due to the slippage of the landing positions of ink dots in all other regions. In other words, by enhancing the error diffusion method element in the regions of image data to be printed in which the merits of the error diffusion method outweigh the merits of the dither method, enhancing the dither method element in regions in which the merits of the dither method outweigh the merits of the error diffusion method, and then performing a halftone process, a printed image can be obtained in which the fine lines in the printed image have superior reproducibility, and in which image quality deterioration due to ink dot landing position slippage is inhibited.

Also, a printed image having adequate fine line reproducibility can be obtained even when a halftone process is performed in which the error diffusion method element is enhanced both for higher-density edge pixels and for lower-density pixels (referred to below as lower-density edge pixels) among the edge pixels constituting an edge in the image being printed. This example is configured so that the error diffusion method element is enhanced and a halftone process is performed only for the higher-density edge pixels. In other words, the processing speed can be increased by reducing the region of the halftone process in which the error diffusion method element is enhanced, and which requires time for processing.

In this example, a dither mask was used in the same manner as the first example except that the target of the comparison with the threshold values of the dither mask was the gradation value of the denoted pixel rather than the correction data dataX. In other words, the predetermined characteristics of the dither mask (dispersibility, periodicity, and the like) can be sufficiently reflected in the dither method element expressed in the dot data.

C. Modifications:

The invention is by no means limited to these examples and embodiments. The invention can be embodied in different ways, provided there is no deviation from the essence of the invention. For example, the following modifications can be made.

(C1) Modification 1:

In the examples, the region determination process was performed by dividing the edge pixels (the higher-density edge pixels in the first and second examples) from the other pixels. However, other division methods can be used.

Here, the pixels provided to the process in Step S143 (FIG. 6) of the first example, that is, the pixels for which the dot ON/OFF decision is made by comparing the correction data dataX and the error diffusion threshold value ED_th, and the pixels provided to the process in which the error diffusion method element in the second example is enhanced, are referred to as pixels which are collectively provided to the error diffusion method process. Also, the pixels provided to the process in Step S144 (FIG. 6) of the first example, that is, the pixels for which the dot ON/OFF decision is made by comparing the denoted pixel data Dn and the dither threshold value TH_th, and the pixels provided to the processing in which the dither method element in the second example are pixels is enhanced, are referred to as pixels collectively provided to the dither method process.

When defined in this manner, the division method in the region determination process can, for example, divide each pixel in the image data into a character region constituting text, a fine-line region constituting fine lines, and another region. Here, the character region and the fine-line region are processed as pixels provided to the error diffusion method process, and the other pixels are processed as pixels provided to the dither method process. When the division and processing are performed in this way, it is possible to obtain a printed image that has superior reproducibility of contours in the character region and the fine-line region due to the characteristics of the error diffusion method (dispersibility, continuity), and that has the superior characteristics of the dither method or the predetermined characteristics of the dither mask in the other region (for example, characteristics for inhibiting the prominence of ink landing position slippage). When the image data to be printed is test data, region determination can be performed as a region determination method in this case by setting different flags for pixels in the text portion and pixels in the other portions in the text data stage.

Also, among pixels constituting a line drawing, the pixels constituting the outer edge of the line drawing can be processing using an error diffusion method process, and the pixels constituting the inside of the line drawing can be processed using a dither method process. In this case, the pixels outside of the line drawing are processed, for example, using the dither method. Performing the process in this manner makes it possible to obtain a printed image having superior reproducibility of the contours in the line drawing.

In addition, the outer edge pixels of the line drawing can be processed by the error diffusion method process. Among the other pixels, the pixels near those processed using the error diffusion method process can be processed by the dither method process, that is, error diffusion is performed. The rest of the pixels are processed using the general dither method process. In other words, a process can be carried out in which a comparison is made between the gradation value of the denoted pixel and the threshold value in the dither mask, a dot ON/OFF decision is made, and error diffusion is not performed. In processes performed using the general dither method, a dot ON/OFF decision can be made relatively easily through a simple comparison with the threshold value. The processing speed can therefore be increased by providing a region in which the processes are performed by the general dither method.

In addition, pixels in a region of image data having more noise in the high-frequency components than a predetermined value can be processed by the error diffusion method process, and the pixels of the other region (a region with less noise in the high-frequency components) can be processed by the dither method process. This can inhibit image deterioration due to interference between the period of the dither mask and the period of the high-frequency components. Regions of considerable noise from high-frequency components and regions of low noise from high-frequency components can be divided by pre-scanning the image data to be printed before the halftone process, and dividing the regions by a predetermined method. For example, discrete cosine transform (DCT) can be used to convert the image data to the size of the frequency components, and the image data can be divided into regions thereby.

(C2) Modification 2:

In Modification 2, the dot ON/OFF determination process can be performed by combining the dot ON/OFF determination process in the first example and the dot ON/OFF determination process in the second example. For example, the dot ON/OFF determination process (FIG. 6) described in the first example can be applied to regions of pixels suitable for error diffusion method processing, such as regions of edge pixels, character regions, and thin line regions; and the dot ON/OFF determination process (FIG. 8) described in the second example can be applied to regions suitable for dither method processing. Conversely, the dot ON/OFF determination process described in the second example can be applied to regions of pixels suitable for error diffusion method processing, and the dot ON/OFF determination process described in the first example can be applied to regions suitable for dither method processing.

Figure 10:
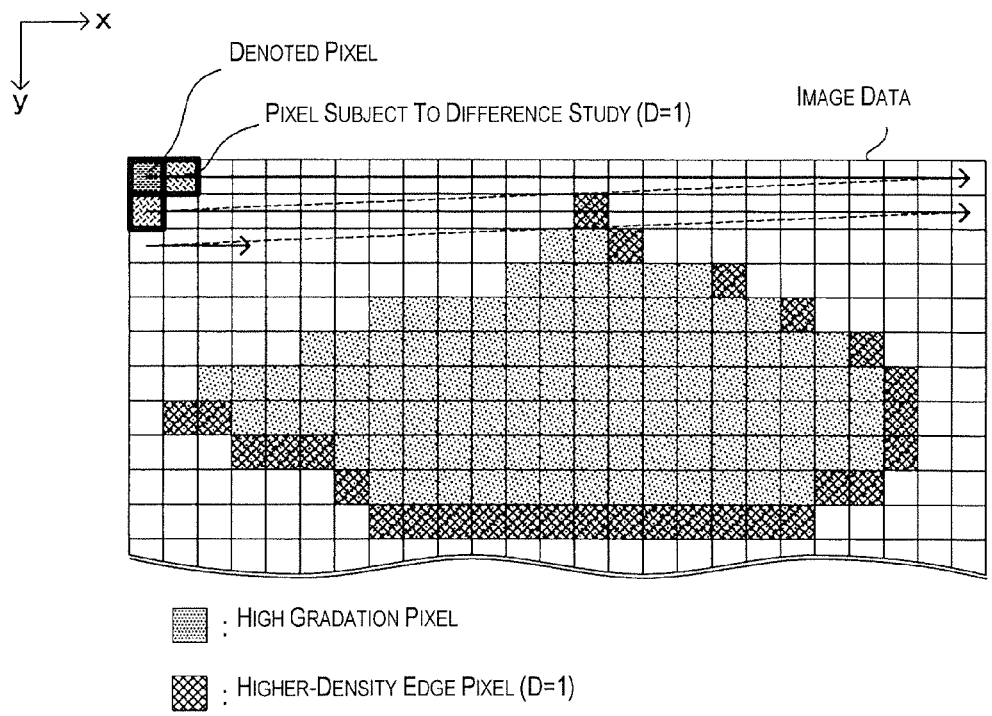
FIG. 10 is an explanatory diagram used to explain the region determination process (D=1) in Modification 3.
Figure 11:
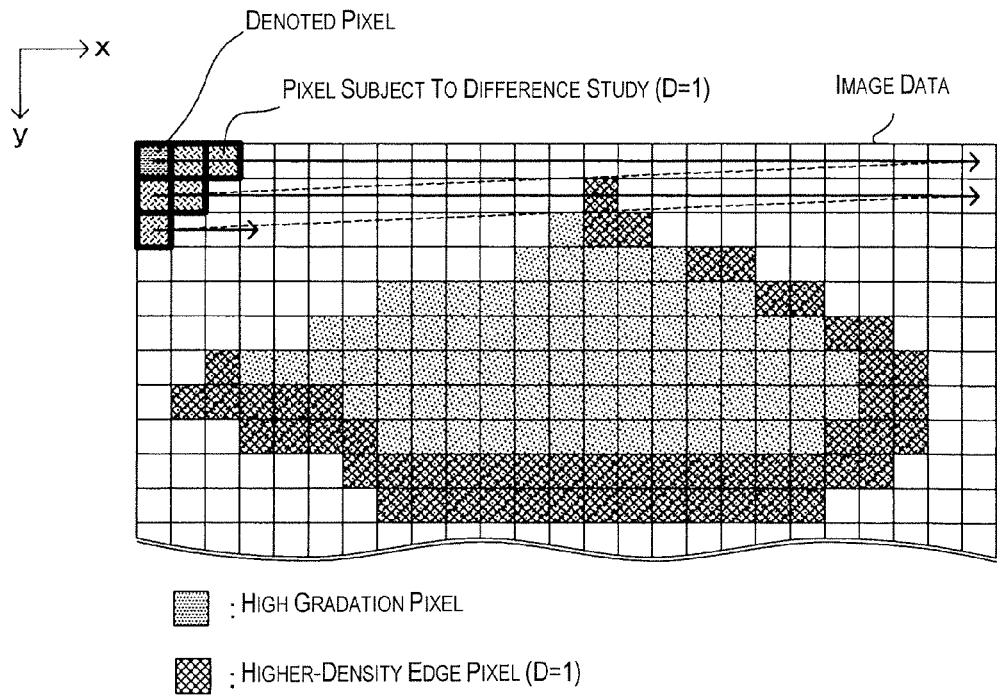
FIG. 11 is an explanatory diagram used to explain the region determination process (D=2) in Modification 3.

(C3) Modification 3:

In the examples, a halftone process based on processing by the error diffusion method was performed on all the edge pixels, including those to the left and right and those that are up and down, in the line-drawing region (in the first and second examples these edge pixels were the higher-density edge pixels). However, a halftone process based the error diffusion method process can be performed on only one side of the edge. In other words, a halftone process based on processing by the error diffusion method is performed only on the left or right edge pixels in a left-right edge, or only on the upper or lower edge pixels in an up-down edge. In this case, setting the pixels subject to a difference study in the manner shown in FIGS. 10 and 11 allows a halftone process to be performed in which the error diffusion method element is enhanced only in the higher-density edge pixels in one side of a line drawing. Because dots are thus generated in a low-density thin line near the edge in which the error diffusion method element has been enhanced, printing can be performed with superior thin line reproducibility and without any break in the thin line.

(C4) Modification 4:

In the examples, a halftone process based on processing by the error diffusion method was performed on the higher-density edge pixels. However, the invention is not limited to this option alone. A halftone process based on processing by the error diffusion method can be performed on edge pixels that include lower-density edge pixels. For example, in a case in which the distance D=1 (see FIG. 4), the pixels subject to a difference study are set as (x−1, y), (x+1, y), (x, y−1), and (x, y+1).

|date[x,y]−date[x−1,y]|>EDGE_TH or

|date[x,y]−date[x+1,y]|>EDGE_TH or

|date[x,y]−date[x,y−1]|>EDGE_TH or

|date[x,y]−date[x,y+1]|>EDGE_TH

These settings allow the process to be realized by determining whether the denoted pixel (x, Y) is an edge pixel. The error diffusion method element is enhanced in an edge pixel detected in this manner, and a halftone process is performed. In this way, a printing process having superior reproducibility for low-density thin lines can be performed.

(C5) Modification 5:

In the examples and modifications, the means for detecting edge pixels was to detect the size of the difference in gradation between the denoted pixel and the pixels subject to a difference study. However, the invention is not limited to this option alone. For example, in cases in which the data to be processed for printing is vector data or text data, pixels in text and line drawings are obvious. Processing inputted data so that a flag is attached to pixels in a text or line-drawing region makes it possible to detect the pixels forming the contours, that is, the edge pixels with ease. By detecting the edge pixels in this manner, the processing can be performed more rapidly.

(C6) Modification 6:

In the halftone process of the examples described above, the gradation value of a denoted pixel was compared with various types of threshold values, and a dot ON/OFF decision was made. However, the gradation value of the denoted pixel (denoted pixel data Dn) can be converted to a recording rate on the basis of a predetermined conversion rule, and a comparison can be made between the gradation value of the recording rate and various types of threshold values. The term "recording rate" refers to the ratio at which dots are recorded per pixel in an arbitrary region. For example, in a case in which a printer 20, 20*a* forms an image with a plurality of dot sizes, such as large dots and small dots, the various types of threshold values and the gradation value of the recording rate calculated per dot size can be compared with each other on the basis of the denoted pixel data Dn.

(C7) Modification 7:

In the examples described above, the printer 20, 20*a* performed the entire printing process shown in FIG. 2. However, in a case in which the printing process is performed by a printing system in which a printer and computer (which constitute a printing apparatus in a broader sense) are connected with each other, some or all of the printing process and halftone process can be performed by either the computer or the printer.

Examples of the invention were described above. However, the invention is by no means limited to these examples. The invention can be embodied in different ways provided there is no deviation from the essence of the invention. For example, the invention is not limited to the serial-type inkjet printer described in the examples above. It can also be applied to other types of printing apparatus, such as an inkjet-type line printer or a laser printer. In addition, the invention does not have to be configured as a printing apparatus. It can also be realized as a printing method, program, or storage medium.

What is claimed is:

1. An image processing apparatus for processing image data having a plurality of pixels and expressing an image using a gradation value for each pixel, the image processing apparatus comprising:
    an input unit configured to input the image data;
    a region-dividing processor configured to divide the image into at least a first region and a second region on the basis of the inputted image data;
    a comparator configured to compare gradation values of pixels in the first region and threshold values corresponding to the pixels of the first region of a dither mask having a plurality of threshold values;
    a first dot-decision processor configured to decide whether or not dots are formed in pixels of the first region among first boundary pixels, which are pixels in the first region near the boundary between the first region and the second region, using information on pixels included in the first region and not using information on pixels included in the second region;
    a second dot-decision processor configured to decide whether or not dots are formed in some of the pixels in the second region, using information on pixels included in the first region and information on pixels included in the second region; and
    a dot data generator configured to generate dot data for the image data using formation or non-formation of dots as decided by the first and second dot-decision processors.

2. The image processing apparatus of claim 1, wherein the first dot-decision processor adds diffusion errors distributed from processed pixels near the first boundary pixels to the gradation values of the first boundary pixels to calculate a first corrected gradation values, and references at least comparison results of the comparator to make decisions on whether or not dots are formed in pixels of the first region, and then calculates errors between the first corrected gradation values and a first decision result values with respect to the first boundary pixels, the first decision result values corresponding to density expressed by the pixels in results of the decisions on whether or not dots are formed in pixels of the first region, and distributes the errors as diffusion errors to unprocessed pixels near the first boundary pixels.

3. The image processing apparatus of claim 1, wherein the second dot-decision processor calculates, with respect to some of the pixels in the second region, second corrected gradation values in which diffusion errors distributed from processed pixels in an adjacent area that includes the first boundary pixels have been added to the gradation values of the pixels, compares the second corrected gradation values and a predetermined threshold value to make decisions on whether or not dots are formed in some of the pixels in the second region, calculates errors between the second corrected gradation values and second decision result values, the second decision result values corresponding to density expressed by the pixels in results of the decisions on whether or not dots are formed in some of the pixels in the second region, and distributes the errors as diffusion errors to pixels in an adjacent area.

4. The image processing apparatus of claim 1, wherein the region-dividing processor divides the image that comprises the plurality of pixels so that the region that satisfies predetermined conditions for a region suitable for processing by a dither method becomes the first region, and the region that satisfies predetermined conditions for a region suitable for processing by an error diffusion method becomes the second region.

5. The image processing apparatus of claim 1, wherein the first dot-decision processor decides, as a result of the comparison, that dots are formed in cases in which the gradation value of a pixel in the first region is greater than the threshold value corresponding to a pixel in the first region of the dither mask, and that dots have not been formed in cases in which the gradation value is less than the threshold value.

6. The image processing apparatus of claim 1, wherein the first dot-decision processor compares a predetermined determination value and third corrected gradation values in which diffusion errors distributed from processed pixels among some of the pixels in an area adjacent to the first region have been added to the gradation values of the pixels, and decides whether or not dots are formed, and, as a result of the comparison by the comparator, adjusts the determination values within a predetermined width so that the determination value applied in cases in which the gradation value of a pixel in the first region is greater than the threshold value corresponding to a pixel in the first region of the dither mask does not exceed the determination value applied in cases in which the gradation value of a pixel in the first region is equal to or less than the threshold value corresponding to a pixel in the first region of the dither mask.

7. The image processing apparatus of claim 1, wherein the second dot-decision processor decides whether or not dots are formed by an error diffusion method, using an error diffusion threshold value prepared in advance as a threshold value used in the error diffusion method.

8. The image processing apparatus of claim 1, wherein the first region is a region composed of pixels without edge pixels, edge pixels being pixels constituting an edge having gradation value whose difference with respect to an adjacent pixel is equal to or greater than a predetermined value, and wherein the second region is a region composed of the edge pixels.

9. The image processing apparatus of claim 1, wherein the second region is a thin-line or character region included in an image.

10. The image processing apparatus of claim 1, wherein the first region is a region composed of inner pixels, which are pixels other than outer edge pixels constituting an outer edge of a line drawing, among pixels constituting the line drawing included in the image, and wherein the second region is a region composed of the outer edge pixels.

11. The image processing apparatus of claim 1, wherein the first region is a region having less noise in high-frequency components than a predetermined value, and wherein the second region is a region having more noise in the high-frequency components than the predetermined value.

12. A printing apparatus for performing a printing operation on the basis of image data having a plurality of pixels and expressing an image using a gradation value for each pixel, the printing apparatus comprising:
an input unit configured to input the image data;
a region-dividing processor configured to divide the image into at least a first region and a second region on the basis of the inputted image data;
a comparator configured to compare gradation values of pixels in the first region and threshold values corresponding to the pixels of the first region of a dither mask having a plurality of threshold values;
a first dot-decision processor configured to add diffusion errors distributed from processed pixels near the first boundary pixels to the gradation values of the first boundary pixels in the first boundary pixels, which are pixels in the first region near the boundary between the first region and the second region to calculate a first corrected gradation values, and configured to reference at least comparison results of the comparator to make decisions on whether or not dots are formed in pixels of the first region, and then calculating errors between the first corrected gradation values and first decision result values with respect to the first boundary pixels, the first decision result values corresponding to density expressed by the pixels in results of the decisions whether or not dots are formed in pixels of the first region, and configured to distribute the errors as diffusion errors to unprocessed pixels near the first boundary pixels;
a second dot-decision processor configured to calculate, with respect to some of pixels in the second region, second corrected gradation values in which diffusion errors distributed from processed pixels in an adjacent area that includes the first boundary pixels have been added to the gradation values of the pixels, configured to compare the second corrected gradation values and a predetermined threshold value to make decisions on whether or not dots are formed in some of the pixels in the second region, configured to calculate errors between the second corrected gradation values and second decision result values, the second decision result values corresponding to density expressed by the pixels in results of the decisions on whether or not dots are formed in some of the pixels in the second region, and configured to distribute the errors as diffusion errors to pixels in an adjacent area;
a dot data generator configured to generate dot data for the image data using formation or non-formation of dots as decided by the first and second dot-decision processors; and
a printing unit configured to perform a printing operation on the basis of the dot data.

13. An image processing method for processing image data having a plurality of pixels and expressing an image using a gradation value for each pixel, the image processing method comprising:
inputting the image data;
dividing the image into at least a first region and a second region on the basis of the inputted image data;
comparing gradation values of pixels in the first region and threshold values corresponding to the pixels of the first region of a dither mask having a plurality of threshold values;

adding diffusion errors distributed from processed pixels near the first boundary pixels to the gradation values of the first boundary pixels, the first boundary pixels being pixels in the first region near the boundary between the first region and the second region to calculate a first corrected gradation values, and referencing at least comparison results of the comparing of the gradation values and the threshold values to make decisions on whether or not dots are formed in pixels of the first region, and then calculating errors between the first corrected gradation values and first decision result values with respect to the first boundary pixels, the first decision result values corresponding to density expressed by the pixels in results of decisions on whether or not dots are formed in pixels of the first region, and distributing the errors as diffusion errors to unprocessed pixels near the first boundary pixels;

calculating, with respect to some of pixels in the second region, second corrected gradation values in which diffusion errors distributed from processed pixels in an adjacent area that includes the first boundary pixels have been added to the gradation values of the pixels, comparing the second corrected gradation values and a predetermined threshold value to make decisions on whether or not dots are formed in some of the pixels in the second region, calculating errors between the second corrected gradation values and second decision result values, the second decision result values corresponding to density expressed by the pixels in results of the decisions on whether or not dots are formed in some of the pixels in the second region, and distributing the errors as diffusion errors to pixels in an adjacent area; and generating dot data for the image data using formation or non-formation of dots as decided by the first and second dot-decision processors.

\* \* \* \* \*